United States Patent
Reeve et al.

(10) Patent No.: US 11,677,810 B2
(45) Date of Patent: Jun. 13, 2023

(54) CONFIGURATION TOOL FOR DEPLOYING AN APPLICATION ON A SERVER

(71) Applicant: International Business Machines Corporation, Armonk, NY (US)

(72) Inventors: John Anthony Reeve, Winchester (GB); Doina Liliana Klinger, Winchester (GB); Chengxuan Xing, Romsey (GB); Tom Soal, Whitehill (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/383,858

(22) Filed: Jul. 23, 2021

(65) Prior Publication Data
US 2023/0027618 A1 Jan. 26, 2023

(51) Int. Cl.
*H04L 67/025* (2022.01)
*H04L 67/00* (2022.01)
(Continued)

(52) U.S. Cl.
CPC ........... *H04L 67/025* (2013.01); *G06F 8/61* (2013.01); *H04L 41/22* (2013.01); *H04L 41/5054* (2013.01); *H04L 67/34* (2013.01)

(58) Field of Classification Search
CPC ....... H04L 67/025; H04L 67/34; H04L 41/22; H04L 41/5054; G06F 8/61
See application file for complete search history.

(56) References Cited

U.S. PATENT DOCUMENTS 7,310,684 B2 * 12/2007 Patrick ............... G06Q 10/00
   709/250
7,533,364 B2 * 5/2009 Ramaswamy ......... G06F 8/433
   707/999.107
(Continued)

FOREIGN PATENT DOCUMENTS

CN    104487948 A    4/2015
CN    105959138 A    9/2016
(Continued)

OTHER PUBLICATIONS

"Auto Populate Dependent Field after Selecting Primary Field", Salesforce Stack Exchange, downloaded from the internet on Jun. 22, 2021, 2 pages, <https://salesforce.stackexchange.com/questions/118481/auto-populate-dependent-field-after-selecting-primary-field>.
(Continued)

*Primary Examiner* — Blake J Rubin
(74) *Attorney, Agent, or Firm* — Gilbert Harmon, Jr.

(57) ABSTRACT

An application configuration tool and associated method for supporting deployment of an application on a server that has a set of configurations available for applications deployed on the server. The method attempts to match every configuration required by the application to a configuration available on the server. In case of multiple candidates that match, one is selected. When there is no match an error message is generated. The method is iterated to inspect each selected configuration to identify any references contained in the selected configuration that themselves need further configurations. The iteration of inspecting and the matching to follow the references is continued until all such references are exhausted either by matching or failure to match and consequent error message generation. Finally, a configuration report is output specifying the selected configurations and, to the extent that not all required configurations have
(Continued)

been matched to available configurations, the error messages.

25 Claims, 6 Drawing Sheets

(51) Int. Cl.
*G06F 8/61* (2018.01)
*H04L 41/22* (2022.01)
*H04L 41/5054* (2022.01)

(56) References Cited

U.S. PATENT DOCUMENTS

| | | | |
|---|---|---|---|
| 8,327,414 B2 | 12/2012 | Strassner | |
| 8,726,264 B1* | 5/2014 | Allen | H04L 67/34 |
| | | | 717/171 |
| 8,887,125 B1* | 11/2014 | Nolan | G06F 8/24 |
| | | | 717/109 |
| 9,003,397 B2 | 4/2015 | Li | |
| 9,354,852 B2 | 5/2016 | Babey | |
| 9,418,040 B2* | 8/2016 | Cordray | H04L 63/10 |
| 9,705,995 B2* | 7/2017 | Edlund | H04L 41/06 |
| 10,049,335 B1* | 8/2018 | Narkier | G06Q 10/0637 |
| 10,216,503 B2 | 2/2019 | Chico De Guzman Huerta | |
| 10,218,589 B1* | 2/2019 | Matthews | H04L 43/06 |
| 10,257,041 B2 | 4/2019 | Byard | |
| 10,318,263 B2 | 6/2019 | Jacobson | |
| 10,318,285 B1* | 6/2019 | Jodoin | G06F 11/3612 |
| 10,320,625 B1* | 6/2019 | Cherumbath | H04L 41/5048 |
| 10,411,975 B2* | 9/2019 | Martinez | H04L 41/40 |
| 10,552,176 B1* | 2/2020 | Putney | G06F 8/71 |
| 10,678,528 B1* | 6/2020 | Acheson | G06F 9/5077 |
| 10,701,136 B1* | 6/2020 | Levi-Raz | H04L 67/10 |
| 10,782,953 B2 | 9/2020 | De Capoa | |
| 11,170,099 B1* | 11/2021 | Sandall | G06F 21/54 |
| 2005/0259590 A1 | 11/2005 | Brown | |
| 2007/0261017 A1* | 11/2007 | Sanghvi | G06F 9/44526 |
| | | | 717/100 |
| 2007/0289008 A1* | 12/2007 | Andreev | H04L 41/08 |
| | | | 726/12 |
| 2008/0059610 A1 | 3/2008 | Lin | |
| 2010/0042604 A1* | 2/2010 | Mechelke | G06F 16/972 |
| | | | 717/172 |
| 2011/0145657 A1* | 6/2011 | Bishop | G06F 11/3442 |
| | | | 714/47.1 |
| 2012/0066674 A1* | 3/2012 | Xie | G06F 8/60 |
| | | | 717/174 |
| 2013/0086204 A1* | 4/2013 | Ghosh | G06Q 10/00 |
| | | | 709/217 |
| 2013/0185715 A1* | 7/2013 | Dunning | G06F 9/45558 |
| | | | 718/1 |
| 2013/0232464 A1* | 9/2013 | Jacquin | G06Q 10/06 |
| | | | 717/104 |
| 2013/0238384 A1* | 9/2013 | Caesar | G06F 8/34 |
| | | | 705/7.27 |
| 2014/0177821 A1* | 6/2014 | Ristock | G06Q 10/0631 |
| | | | 379/266.08 |
| 2015/0268948 A1* | 9/2015 | Plate | G06F 21/577 |
| | | | 717/123 |
| 2015/0324182 A1* | 11/2015 | Barros | G06F 9/455 |
| | | | 717/174 |
| 2015/0331828 A1* | 11/2015 | Maes | G06F 13/4208 |
| | | | 710/104 |
| 2015/0365275 A1* | 12/2015 | Iliev | H04L 41/5096 |
| | | | 709/220 |
| 2015/0370550 A1 | 12/2015 | Jacobson | |
| 2015/0378700 A1* | 12/2015 | Rachamadugu | G06F 8/71 |
| | | | 717/120 |
| 2016/0366246 A1* | 12/2016 | Battle | G06F 9/5055 |
| 2016/0371133 A1* | 12/2016 | Jhunjhunwala | G06F 11/0769 |
| 2017/0034012 A1* | 2/2017 | Douglas | H04L 41/0806 |
| 2017/0201569 A1* | 7/2017 | Fu | G06F 9/45558 |
| 2017/0339013 A1* | 11/2017 | Allen | H04L 41/0816 |
| 2018/0052898 A1* | 2/2018 | Allan | G06F 3/0482 |
| 2018/0115551 A1* | 4/2018 | Cole | H04L 63/083 |
| 2018/0121797 A1* | 5/2018 | Prabhu | G06Q 40/02 |
| 2018/0157472 A1* | 6/2018 | Chen | H04L 41/0806 |
| 2018/0227183 A1* | 8/2018 | Crudele | H04L 41/0823 |
| 2018/0324204 A1* | 11/2018 | McClory | G06F 11/3684 |
| 2018/0351782 A1* | 12/2018 | Tammana | H04L 41/069 |
| 2018/0365121 A1* | 12/2018 | Harneja | G06F 16/2365 |
| 2019/0079857 A1* | 3/2019 | Sivasubramanian | G06F 12/02 |
| 2019/0220289 A1* | 7/2019 | Driesen | G06F 8/60 |
| 2019/0312800 A1* | 10/2019 | Schibler | G06F 9/45558 |
| 2019/0324743 A1* | 10/2019 | Sajadi | G06F 8/71 |
| 2019/0332485 A1* | 10/2019 | Gill | G06F 9/5027 |
| 2020/0036593 A1* | 1/2020 | Sethi | H04L 41/145 |
| 2020/0081727 A1* | 3/2020 | Ahluwalia | H04L 67/34 |
| 2020/0097347 A1* | 3/2020 | Mahindru | G06F 11/076 |
| 2020/0110823 A1* | 4/2020 | Steuer | G06F 16/252 |
| 2020/0133651 A1* | 4/2020 | Holzer | G06F 8/65 |
| 2020/0249914 A1* | 8/2020 | Bragdon | G06F 8/35 |
| 2020/0374193 A1* | 11/2020 | Ly | H04L 41/5051 |
| 2020/0379794 A1 | 12/2020 | Kim | |
| 2020/0394054 A1* | 12/2020 | Galoso | G06F 9/451 |
| 2020/0401671 A1* | 12/2020 | Yang | G06F 3/0604 |
| 2021/0311859 A1* | 10/2021 | De Sousa Bispo | G06F 9/541 |
| 2021/0334148 A1* | 10/2021 | Prakash | G06F 11/3072 |
| 2021/0360083 A1* | 11/2021 | Duggal | H04L 67/34 |
| 2022/0019476 A1* | 1/2022 | Sanchez | G06F 8/60 |
| 2022/0038367 A1* | 2/2022 | Devta | H04L 45/745 |
| 2022/0058042 A1* | 2/2022 | Vanjare | H04L 41/0895 |
| 2022/0070065 A1* | 3/2022 | Finn, II | H04L 41/145 |
| 2022/0188172 A1* | 6/2022 | Gupta | G06F 9/5038 |
| 2022/0247769 A1* | 8/2022 | Erlingsson | G06F 9/5072 |
| 2022/0337668 A1* | 10/2022 | Procházka | H04L 67/34 |
| 2022/0385535 A1* | 12/2022 | Verma | H04L 41/0886 |

FOREIGN PATENT DOCUMENTS

| | | |
|---|---|---|
| TW | 200410524 A | 6/2004 |
| WO | 2005106666 A1 | 11/2005 |

OTHER PUBLICATIONS

Boldt et al., "Complementary Method for Object Filtering in a Graphical User Interface", An IP.com Prior Art Database Technical Disclosure, Original Publication Date: Oct. 1, 1996, Original Disclosure Information: TDB v39 n10 10-96 p. 179-180, IP.com No. IPCOM000118187D, IP.com Electronic Publication Date: Apr. 1, 2005, 3 pages.

Hakiel et al., "Selected Object Filter on Pop-Up Menu", An IP.com Prior Art Database Technical Disclosure, Original Publication Date: Sep. 1, 1996, Original Disclosure Information: TDB v39 n9 09-96 p. 157-162, IP.com No. IPCOM000118109D, IP.com Electronic Publication Date: Mar. 31, 2005, 7 pages.

Mell et al., "The NIST Definition of Cloud Computing", Recommendations of the National Institute of Standards and Technology, Special Publication 800-145, Sep. 2011, 7 pages.

International Search Report and Written Opinion, International Application No. PCT/IB2022/056324, International Filing Date Jul. 8, 2022.

* cited by examiner

CONFIGURATION TOOL FOR DEPLOYING AN APPLICATION ON A SERVER

TECHNICAL FIELD

The present disclosure relates to computer programs, computer program products and computer-implemented methods to support configuring a server for deployment of an application.

BACKGROUND

To ready an application for deployment on a server, it is necessary to configure the server by selecting suitable configuration objects. The selection needs to take account of the application's process flow as may be defined by one or more process flow artefacts. In some cases, the application may be exclusively defined by one or more process flow artefacts. In other cases, there may additionally be other kinds of artefacts used to define the application.

Deploying applications with the aid of configuration objects is an important approach in distributed network architectures, such as an enterprise service bus (ESB). In a distributed network architecture, many applications may be deployed in a complex interdependent way across multiple hardware and software platforms, such that any given application can adopt a server role or a client role as needed, thereby creating a flexible web of client-server relationships. An ESB application typically has a large number of configuration types. In a given distributed computer system, there may be multiple configuration objects of any given configuration type, for example different objects of the same type may be provided for different environments (e.g., development, test, preproduction, production).

Configuration objects are instances of a given configuration type. Some configuration types may be standard, whereas other configuration types may be vendor specific. The number of configuration objects could be a hundred or more. The number of configuration types also tends to grow over time as more functionality is added. Example configuration objects relate to third party connector accounts; a connection to a trust store (e.g., a repository of digital certificates such as public keys); and Open Database Connectivity (ODBC) details or server policies. The configuration objects have descriptors. For example, the flow artefact of an application might contain descriptors specifying the environment that the application needs to run successfully.

To configure an application for deployment on a particular server, the user typically is shown a list of available configuration objects on a per configuration type basis and is given some guidance on how to make appropriate selections from these type-specific lists of configuration objects.

BRIEF SUMMARY OF THE INVENTION

According to an embodiment of the present invention, a computer automated method for supporting deployment of an application on a server, the server being provided with a set of configurations that are available for use by applications deployed on the server, the method comprising: matching configurations required by the application to configurations available in the set of configurations, wherein, for each required configuration that is matched to at least one configuration that is available in the set of configurations, selecting one of the available configurations, and wherein, for each required configuration that cannot be matched, generating an error message specifying its unavailability; inspecting each selected required configuration to identify any references contained therein to further configurations that are required; performing the matching again in respect of each said further configuration; and iterating the inspecting and the matching to follow the references until all such references are exhausted by one of successful matching of a required configuration to an available configuration and generating an error message indicating unavailability of a required configuration; and outputting a configuration report specifying the available configurations that have been selected as being required by the application and, to the extent that not all required configurations have been matched to available configurations, the error messages.

According to an embodiment of the present invention, a computer program stored on a computer readable medium and loadable into the internal memory of a computing device, comprising software code portions, when said program is run on a computing device, for performing a computer automated method for supporting deployment of an application on a server, the server being provided with a set of configurations that are available for use by applications deployed on the server, the method comprising: matching configurations required by the application to configurations available in the set of configurations, wherein, for each required configuration that is matched to at least one configuration that is available in the set of configurations, selecting one of the available configurations, and wherein, for each required configuration that cannot be matched, generating an error message specifying its unavailability; inspecting each selected required configuration to identify any references contained therein to further configurations that are required; performing the matching again in respect of each said further configuration; iterating the inspecting and the matching to follow the references until all such references are exhausted by one of successful matching of a required configuration to an available configuration and generating an error message indicating unavailability of a required configuration; and outputting a configuration report specifying the available configurations that have been selected as being required by the application and, to the extent that not all required configurations have been matched to available configurations, the error messages.

According to an embodiment of the present invention, a computer automated method for supporting deployment of an application on a server, the server being provided with a set of configurations that are available for use by applications deployed on the server, the method comprising: matching configurations required by the application to configurations available in the set of configurations, wherein, for each required configuration that is matched to at least one configuration that is available in the set of configurations, selecting one of the available configurations, and wherein, for each required configuration that cannot be matched, generating an error message specifying its unavailability; inspecting each selected required configuration to identify any references contained therein to further configurations that are required; performing the matching again in respect of each said further configuration; iterating the inspecting and the matching to follow the references until all such references are exhausted by one of successful matching of a required configuration to an available configuration and generating one or more required missing configurations; updating the application with the one or more missing configurations; and outputting a configuration report specifying the available configurations that have been selected as being required by the application and, to the extent that not all required configurations have been matched to available configurations, the one or more generated configurations.

According to an embodiment of the present invention, a computer program product storing a computer program comprising software code portions, which, when run on a computing device, cause the computing device to perform a method for supporting deployment of an application on a server, the server being provided with a set of configurations that are available for use by applications deployed on the server, the method comprising: matching configurations required by the application to configurations available in the set of configurations, wherein, for each required configuration that is matched to at least one configuration that is available in the set of configurations, selecting one of the available configurations, and wherein, for each required configuration that cannot be matched, generating an error message specifying its unavailability; inspecting each selected required configuration to identify any references contained therein to further configurations that are required; performing the matching again in respect of each said further configuration; and iterating the inspecting and the matching to follow the references until all such references are exhausted by one of successful matching of a required configuration to an available configuration and generating an error message indicating unavailability of a required configuration; and outputting a configuration report specifying the available configurations that have been selected as being required by the application and, to the extent that not all required configurations have been matched to available configurations, the error messages.

According to an embodiment of the present invention, A server apparatus provided with a set of configurations that are available for use by applications deployed on the server apparatus and an application configuration tool operable to support deployment of an application on the server apparatus by: matching configurations required by the application to configurations available in the set of configurations, wherein, for each required configuration that is matched to at least one configuration that is available in the set of configurations, selecting one of the available configurations, and wherein, for each required configuration that cannot be matched, generating an error message specifying its unavailability; inspecting each selected required configuration to identify any references contained therein to further configurations that are required; performing the matching again in respect of each said further configuration; and iterating the inspecting and the matching to follow the references until all such references are exhausted by one of successful matching of a required configuration to an available configuration and generating an error message indicating unavailability of a required configuration; and outputting a configuration report specifying the available configurations that have been selected as being required by the application and, to the extent that not all required configurations have been matched to available configurations, the error messages.

BRIEF DESCRIPTION OF THE DRAWINGS

In the following, the present invention will further be described by way of example only with reference to exemplary embodiments illustrated in the Figures.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

For conciseness we refer to a process flow artefact as a flow artefact.

We consider an example case where it is desired to deploy an application A with a single flow artefact F on a server S. Flow artefact F contains a node N that requires a configuration of type T.

The first part of the analysis can look at the content of the application to be deployed and its configuration object requirements. It is noted that not all configuration objects that are needed to deploy an application on a specific server are necessarily deducible from the content of the application alone, since the application content may contain external references to other configuration objects. A node may interact with one or more other nodes which may be internal to the application or external to the application. Example external nodes are a node for sending emails (e.g., to 'Gmail') and a node for adding information to a remotely hosted customer relationship management (CRM) platform (e.g., creating a sales lead). In our example, the configuration tool can analyze the list of configuration objects available for the server S to find those of configuration type T required by the flow artefact F. If there are multiple candidates, the configuration tool may suggest one, or present all candidates to prompt the user to select one for node N. If there is only one candidate, then the configuration tool can automatically make the selection of this candidate for node N. (If there are no candidates, then an error message can be generated to indicate the unavailability of a suitable configuration object.) The selected configuration object can be labeled T1.

The configuration tool then can proceed further by analyzing the newly selected configuration object T1. If T1 is self-contained, then this can constitute a complete configuration for deploying the application A (or at least its flow artefact F) on the intended server, and no further iterations are needed to configure flow artefact F. On the other hand, it might be that T1 references another node P that requires a configuration of type C, for which there is a suitable configuration object C1. The configuration tool then can add C1 alongside T1 as part of the configuration object requirement of A.

Further iterations can then be performed as needed to the extent that a configuration that was newly added in the previous iteration is not self-contained but rather references or links to one or more other nodes with their own configuration object requirements, and these references can be resolved without error by adding a further configuration object. At some point in the iterations, there will be no more links to follow and the iteration can come to an end.

The configuration tool then can output a configuration report for the application to be deployed. The report can specify the selected (i.e., available) configuration objects required by the application and, to the extent that not all required configuration objects were found, the error messages specifying which configuration objects are missing. For any given application, or more specifically for its flow artefact(s), the configuration report can represent either a full configuration (no errors) or an incomplete configuration (errors). In a full configuration, a complete set of configuration objects can be defined, this set being sufficient to allow the application to be deployed on the server, e.g., on a virtualized server in a distributed network environment. In an incomplete configuration, an incomplete set of configuration objects can be defined as well as one or more error messages providing information on the respective missing configuration objects, this information preferably being as detailed and specific as possible. Examples of specific error messages are:

Cannot find a configuration object of type 'Accounts' that contains 'Salesforce accounts' Required configuration object T1 contains an unresolved reference '$secret1' that cannot be found in any configuration objects. Consider creating a new configuration object for this object or update an existing one to include it.

In another aspect the configuration tool can determine if the application contains the required configuration objects and for any missing configuration objects the configuration can generate configuration objects, based on the deployment associated with the application, and update the application configuration. Further, the configuration tool can generate one or more notification messages providing information on the respective generated configuration objects, this information preferably being as detailed and specific as possible.

To the extent that a complete configuration is not provided, the method can provide the user error messages detailing the required configuration objects that are not available with the current set of configuration objects available for the server.

Figure 1:
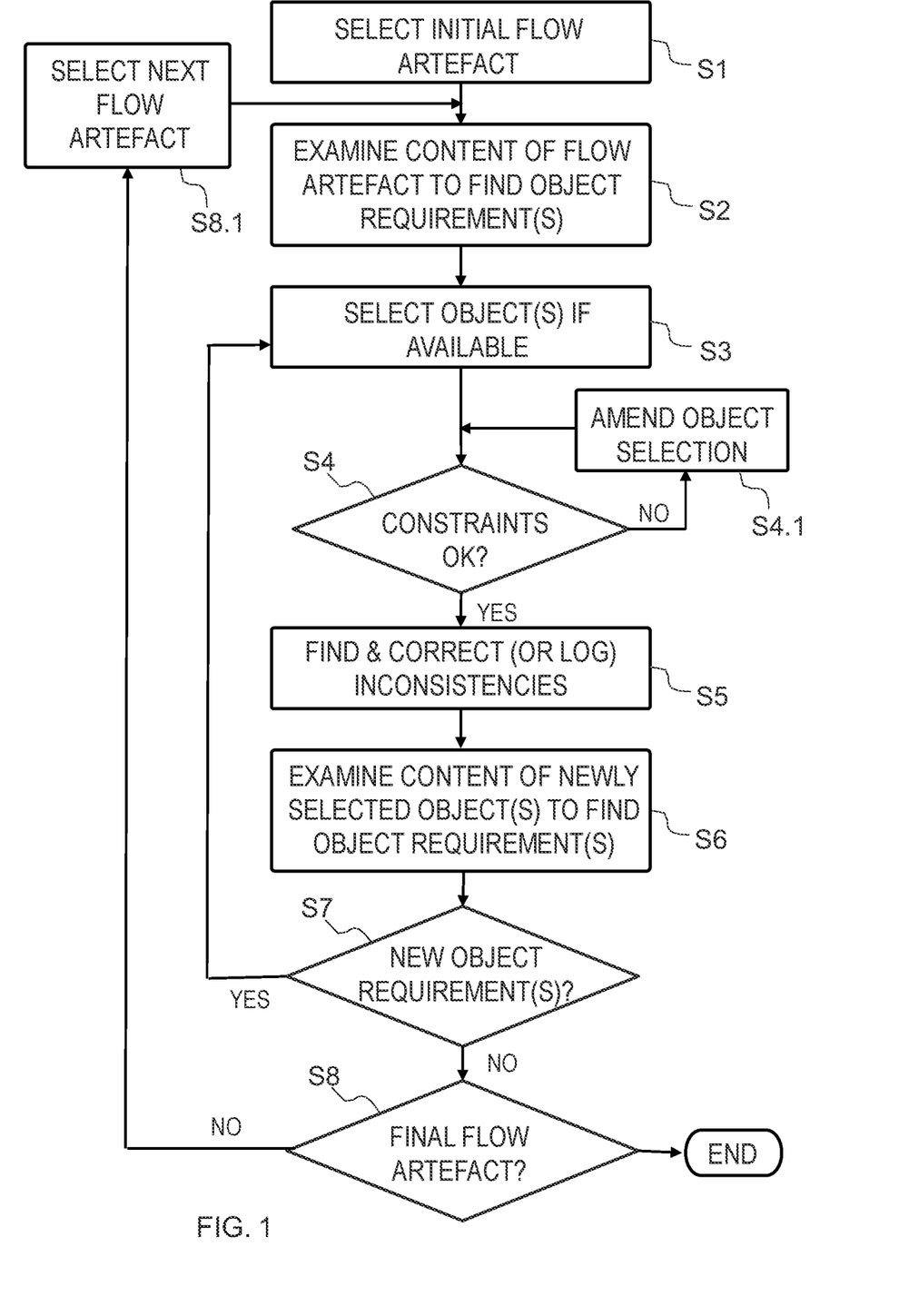
FIG. 1 is a flow chart of a method according to an embodiment of the disclosure.

FIG. 1 is a flow chart showing an example of the above-described method.

Step S1: The user selects a first flow artefact of the application.

Step S2: The content of the flow artefact is analyzed to find required configuration objects.

Step S3: Each required configuration object is automatically selected (i.e. if only one instance satisfies the constraints), or the user is prompted via a user interface to make a selection in case there are multiple instances that satisfy the constraints (optionally with a recommendation), or the user is informed if no object is available (i.e. no instances satisfy the constraints) through generating an error message.

Step S4: An analysis is performed as follows:
 a check is made if all constraints are satisfied with the current configuration object selection. (If yes then no further action needed.)
 if 'no', a check is made if it can find an alternative configuration object selection that satisfies the constraints (Step S4.1). This loop can automatically terminate after a certain number of failed attempts to find a combination of objects that satisfies all constraints.
 if 'yes', a configuration object selection is made (or a suggestion is made from multiple possible options or the user is prompted neutrally to make a selection from among the multiple possible options).
 if a configuration object selection cannot be found that satisfies all constraints, an error message is generated through making an entry in the error part of the configuration report.

Step S5: for the current selection of configuration objects, the system checks for any inconsistencies (name clashes, cardinalities restrictions). If possible, any inconsistencies can be automatically corrected (e.g., by renaming to resolve name clashes). Alternatively, inconsistencies can be noted as part of the configuration report.

Step S6: The content of the objects selected in the immediately previous iteration of Step S3 is analyzed. Go to Step S3 so that selection of further objects can take place for the objects found in the content of the objects selected in the immediately previous iteration (immediately previous traversal of Step S3). Analysis of the objects can then be carried out as before (Steps S4 & S5).

Step S7: Go to Step S4 until no more new configuration objects are added and all constraints are satisfied (as far as is possible).

Step S8: If the application involves deploying multiple flow artefacts, then select the next flow artefact (Step S8.1) and repeat from Step S2 and repeat until all flow artefacts have been processed.

Embodiments of the method may be configured to allow configuration objects to be selected taking account of various different kinds of constraints, i.e., relationship requirements, involving configuration objects and their associated configuration types as now described.

A first kind of constraint can be in the relationship between flow artefacts and configuration types: Three examples of this include. First, cardinalities may be associated with required configuration types. For example, when deploying a flow artefact, precisely one 'accounts.yaml' file needs to be chosen for each 'serverconf.yaml' file. Second, there may be dependencies based on flow artefacts, so that if a certain type of processing node is in the process flow of a flow artefact, the flow artefact is required to include all configuration objects that are associated with that processing node. For example, a database node requires a sample data-source configuration information file, e.g., 'odbc.ini', with the correct content. Third, all assets of a specific type may need to be present in the configuration type, e.g., all accounts used in a flow artefact need to be present in the 'accounts.yaml'.

A second kind of constraint can be in the relationship between configuration types: Two examples of this include. First, there may be mutually exclusive types that cannot be selected together. For example, if the user selects a Type A instance then this may preclude selection a Type B instance. A concrete example would be 'credentials.yaml' and 'accounts.yaml' which cannot both be selected. Second, there may be a type dependency with min-max requirements. For example, if a user selects a configuration type A, then a certain number of type B configuration objects must be selected, where the number must be in a range from a minimum to a maximum.

A third kind of constraint can be in the relationship between configuration objects: Three examples of this include. First, there may be a requirement to avoid content clashes between selected configuration objects. When deploying a flow artefact, the user might select a number of these objects to configure the flow artefact for deployment on the intended server. Care should be taken that there are no name clashes in the selection, since name clashes invalidate the selection of the configuration objects. For example, configuration objects of type 'setdbparms' contain credentials that need to be identified by unique names. Second, there may be content dependencies between configuration objects that need to be honored. For example, selecting a type A configuration object which contains references may require the references to be defined in a type B configuration object. Third, there may be a requirement that all references from selected type A configuration objects need to be present in a type B configuration object. For example: a configuration object of type EVENT_STREAM_CREDENTIALS contains a number of variables marked with $ and all such variables need to be defined in a configuration object of the type of EVENT_STREAM_CREDENTIALS_SECRET.

Figure 2:
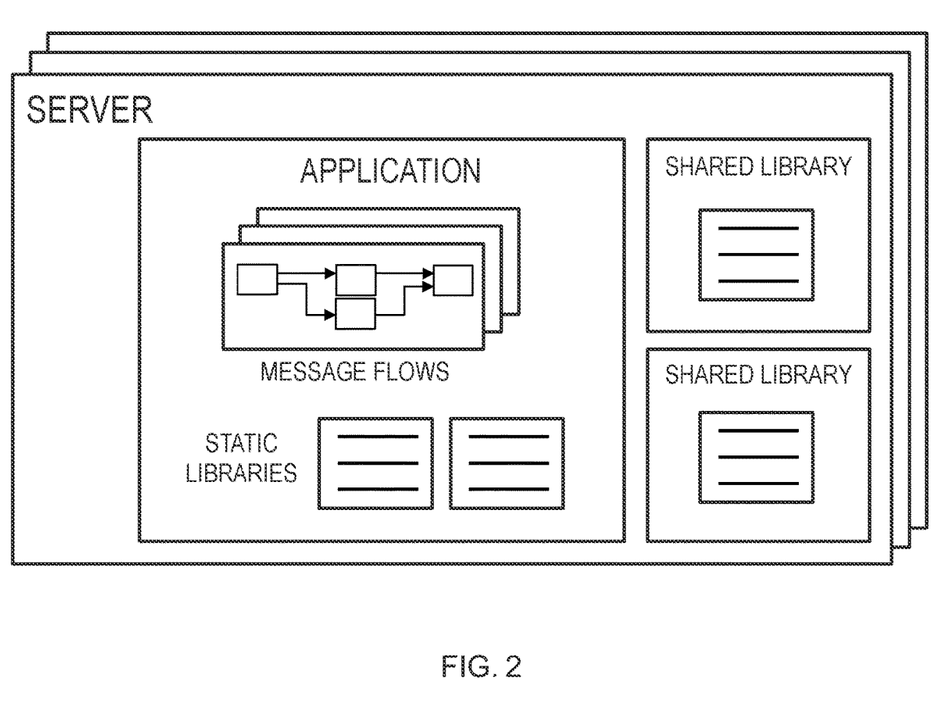
FIG. 2 is a block diagram of an example node on which embodiments of the disclosure can be hosted.

FIG. 2 is a block diagram of example server instances on which embodiments of the disclosure can be hosted. Each server can provide a runtime environment for message flows and resources, including applications and the message flows between applications. The resources may further include static and/or shared libraries accessible by the applications. Messages can be routed from sender to recipient based on the content of the message. The message flows can control message routing. A message flow can describe the operations to be performed on an incoming message, and the sequence in which they are carried out. Each message flow can comprise a series of steps used to process a message and connections defining routes through the processing. A server environment as shown is provided.

Figure 3:
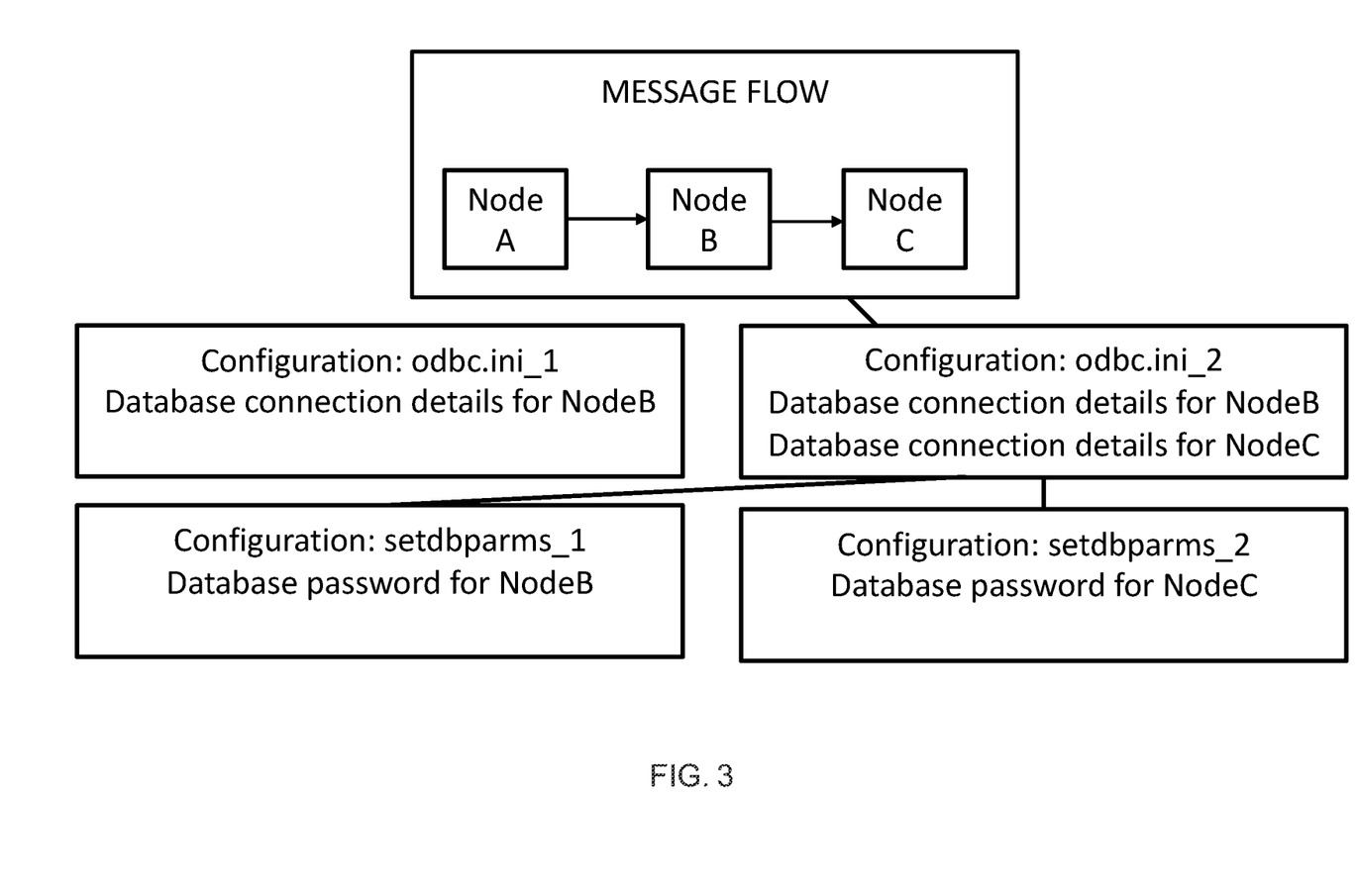
FIG. 3 is a schematic drawing showing an example network of three nodes.

FIG. 3 is a schematic drawing showing an example network of three nodes: NodeA NodeB and NodeC, linked by flow and configuration objects. The nodes are shown connected in series by way of example. The links between the configuration objects as illustrated by lines are not physical links but rather dependencies that are inferred by the above-described methods based on the content of the configuration objects. In order to enable, NodeB and NodeC need to be configured to allow them to connect correctly to a database. The 'odbc.ini' files contain connection details and the 'setdbparms' files contain credentials. There can only be one 'odbc.ini' file per system so the correct one needs to be selected. There can be more than one 'setdbparm' file but when there are multiple such files, they cannot have clashing entries. A first parse of the command 'find odbc.ini_1' matches with NodeB and from that it is known that 'setdbparms_1' is also required. Then it would be seen that NodeC is not configured, so 'odbc.ini2' would be tried instead. In turn, 'odbc.ini2' requires both 'setdbparms_1' and 'setdbparms_2'. With this set of configurations, the system is complete and can be run to connect to the database.

In summary, an application configuration tool and associated method is provided for supporting deployment of an application on a server that has a set of configurations available for applications deployed on the server. The method attempts to match every configuration required by the application to a configuration available on the server. In case of multiple candidates that match, one is selected. When there is no match an error message is generated. The method is iterated to inspect each selected configuration to identify any references contained in the selected configuration that themselves need further configurations. The iteration of inspecting and the matching to follow the references is continued until all such references are exhausted either by matching or failure to match and consequent error message generation. Finally, a configuration report can be output specifying the selected configurations and, to the extent that not all required configurations have been matched to available configurations, the error messages.

Figure 4:
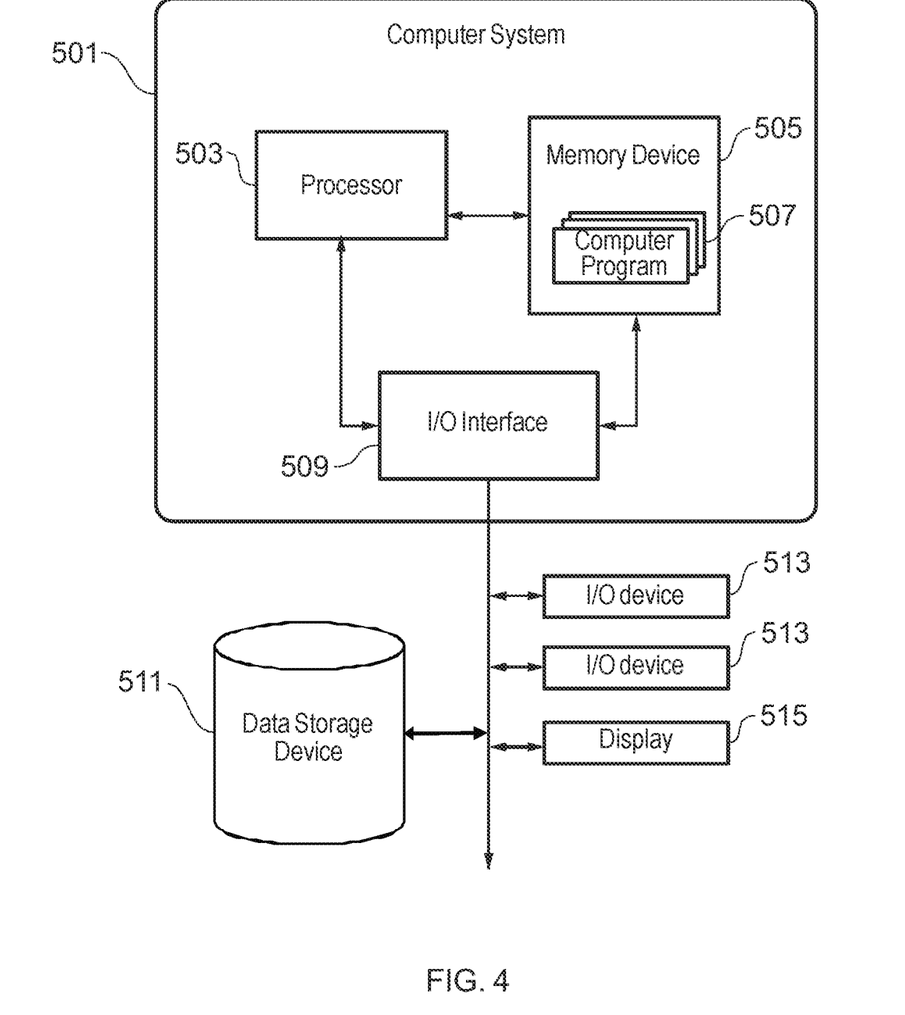
FIG. 4 shows a generic computer device which may be used as part of a computer system according to some embodiments of the invention.

FIG. 4 shows a structure of a computer system 501 and computer programs 507 that may be used to implement embodiments of the invention. The computer system may be a server as described above, and the computer programs 507 may be applications as described above. The computer system 501 comprises a processor 503 to provide a processor resource coupled through one or more I/O interfaces 509 to one or more hardware data storage devices 511 and one or more I/O devices 513, which can manage graphic object requests, and a display 515 on which the graphics objects can be displayed. The processor 503 may also be connected to one or more memory devices 505. At least one memory device 505 with a memory resource contains stored computer programs 507. The computer programs each comprise computer-executable instructions. The data storage devices 511 may store the computer programs 507. The computer programs 507 stored in the storage devices 511 are each configured to be executed by the processor 503 via the memory devices 505. The processor 503 executes the stored computer programs 507.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computer system. Rather, embodiments of the present invention are capable of being implemented in conjunction with any other type of computer system now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computer system is service oriented with a focus on statelessness, low coupling, modularity, and semantic interoperability. At the heart of cloud computing is an infrastructure that includes a network of interconnected nodes.

Figure 5:
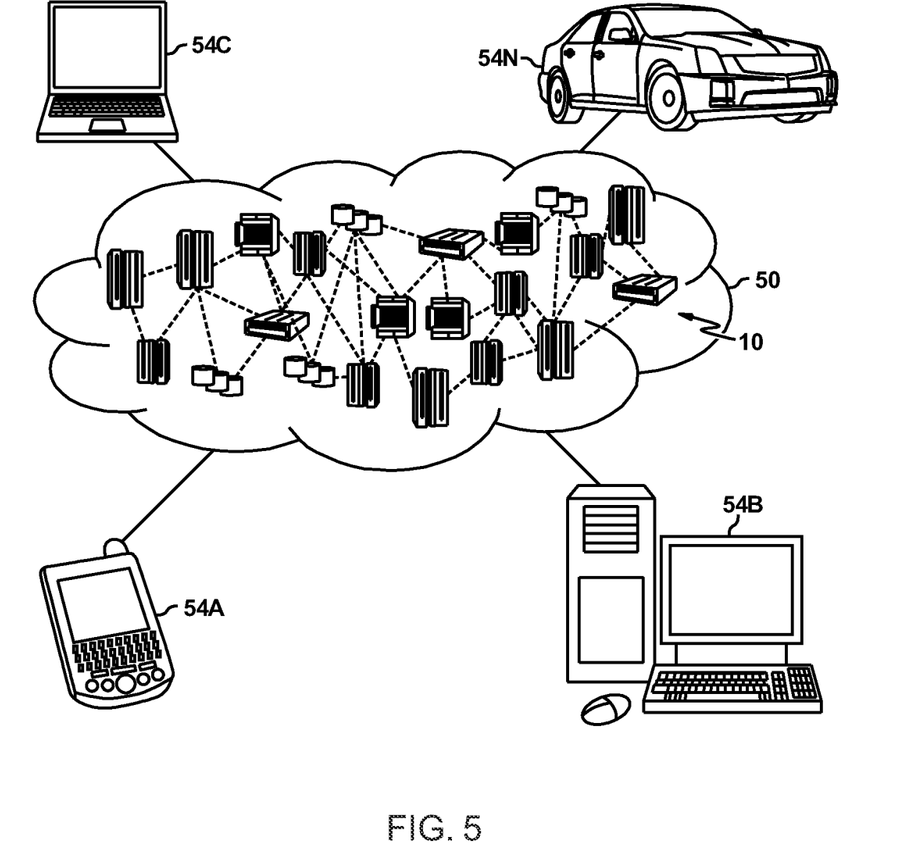
FIG. 5 depicts a cloud computer system according to an embodiment of the disclosure.

Referring now to FIG. 5, illustrative cloud computer system 50 is depicted. As shown, cloud computer system 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computer system 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computer system 50 can communicate with any type of computerized device over any type of network and/or network addressable connection (e.g., using a web browser).

Figure 6:
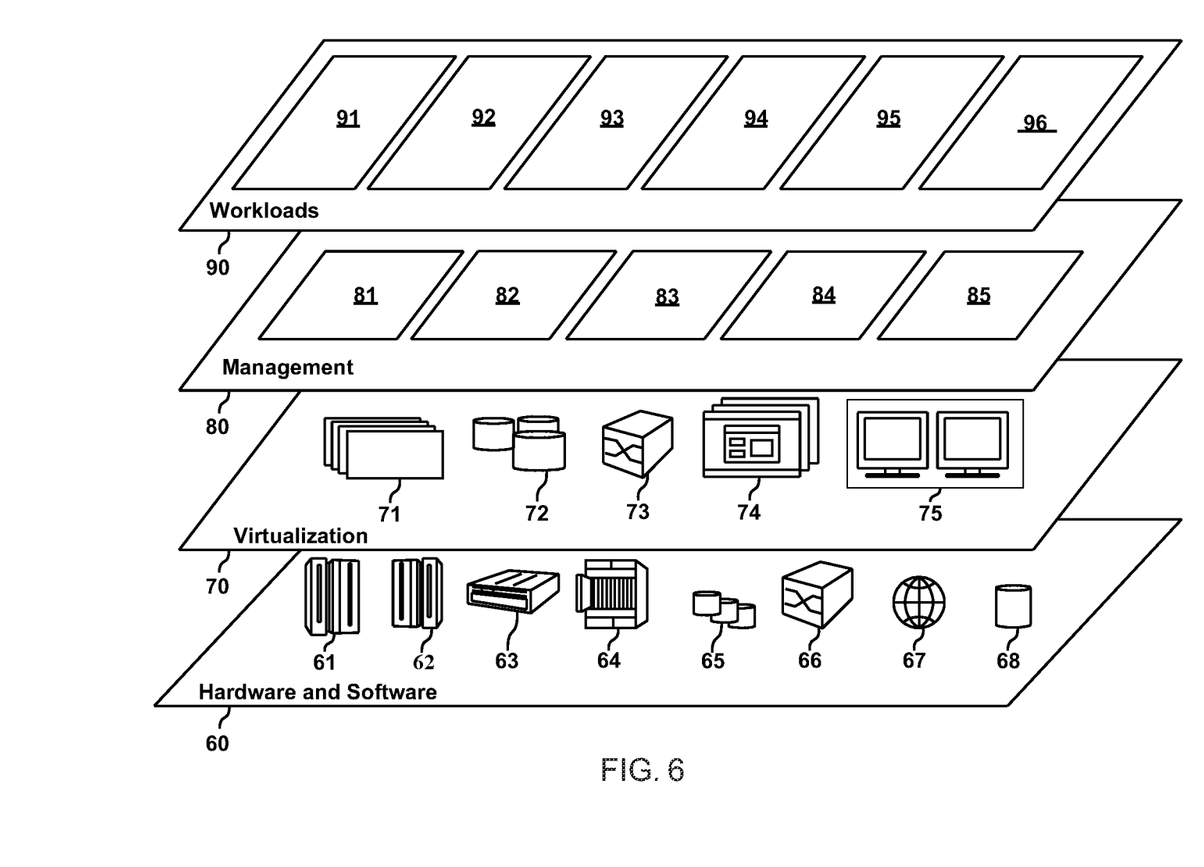
FIG. 6 depicts abstraction model layers according to an embodiment of the disclosure.

Referring now to FIG. 6), a set of functional abstraction layers provided by cloud computer system 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computer system. Metering and Pricing 82 provide cost tracking as resources are utilized within the cloud computer system, and billing or invoicing for consumption of these resources. In one example, these resources may include application software licenses. Security provides identity verification for cloud consumers and tasks, as well as protection for data and other resources. User portal 83 provides access to the cloud computer system for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computer system may be utilized. Examples of workloads and functions which may be provided from this layer include: mapping and navigation 91; software lifecycle management 92; virtual classroom education delivery 93; data analytics processing 94; transaction processing 95; and an application configuration tool 96 according to embodiments of the disclosure.

It will be clear to one skilled in the art that many improvements and modifications can be made to the foregoing exemplary embodiment without departing from the scope of the present disclosure.

What is claimed is:

1. A computer automated method for supporting deployment of an application on a server, the server being provided with a set of configurations that are available for use by applications deployed on the server, the method comprising:
matching configurations required by the application to configurations available in the set of configurations, wherein, for each required configuration that is matched to at least one configuration that is available in the set of configurations, selecting one of the available configurations, and wherein, for each required configuration that cannot be matched, generating an error message specifying its unavailability and generating missing configuration objects, based on the deployment associated with the application, and updating each required configuration;
inspecting each selected required configuration to identify any references contained therein to further configurations that are required;
performing the matching again in respect of each said further configuration;
iterating the inspecting and the matching to follow the references until all such references are exhausted by one of successful matching of a required configuration to an available configuration and generating one or more user-readable text error messages, indicating unavailability of a required configuration, to a configuration report; and
outputting the configuration report specifying the available configurations that have been selected as being required by the application and, to the extent that not all required configurations have been matched to available configurations, the one or more user-readable text error messages.

2. The computer automated method of claim 1, wherein in cases where all required configurations have been matched to available configurations, the method further comprises:
configuring the server to run the application based on the configuration report; and
deploying the application on the server.

3. The computer automated method of claim 1, wherein, when a required configuration is matched to only one available configuration, then selecting that configuration, and wherein, when a required configuration is matched to multiple available configurations which provide respective suitable candidates for selection, then prompting a user to make a selection from among the suitable candidates via a user interface.

4. The computer automated method of claim 1, wherein the application comprises at least one artefact and the matching, inspecting, performing and iterating are performed separately for each artefact.

5. The computer automated method of claim 4, wherein said at least one artefact includes at least one process flow artefact.

6. The computer automated method of claim 5, wherein the server comprises a plurality of processing nodes and each processing node is associated with a requirement for at least one configuration, and wherein each process flow artefact defines a process flow of the application in terms of how the application traverses the processing nodes.

7. The computer automated method of claim 1, wherein the configurations are classified by type and the matching of configurations requires a matching of type.

8. The computer automated method of claim 1, wherein the set of configurations is associated with a set of constraints defining conditions that are to be fulfilled by selected configurations and the method further comprises checking that the selected configurations satisfy the constraints.

9. A computer program stored on a computer readable medium and loadable into internal memory of a computing device, comprising software code portions, when said program is run on a computing device, for performing a computer automated method for supporting deployment of an application on a server, the server being provided with a set of available configurations for use by applications deployed on the server, the method comprising:
matching configurations required by the application to configurations available in the set of configurations, wherein, for each required configuration that is matched to at least one configuration that is available in the set of configurations, selecting one of the available configurations, and wherein, for each required configuration that cannot be matched, generating an error message specifying its unavailability and generating missing configuration objects, based on the deployment associated with the application, and updating each required configuration;
inspecting each selected required configuration to identify any references contained therein to further configurations that are required;
performing the matching again in respect of each said further configuration;
iterating the inspecting and the matching to follow the references until all such references are exhausted by one of successful matching of a required configuration to an available configuration and generating a user-readable text error message indicating unavailability of a required configuration, to a configuration report; and
outputting the configuration report specifying the available configurations that have been selected as being required by the application and, to the extent that not all required configurations have been matched to available configurations, the error messages.

10. A computer automated method for supporting deployment of an application on a server, the server being provided with a set of configurations that are available for use by applications deployed on the server, the method comprising:
matching configurations required by the application to configurations available in the set of configurations, wherein, for each required configuration that is matched to at least one configuration that is available in the set of configurations, selecting one of the available configurations, and wherein, for each required configuration that cannot be matched, generating a user-readable text error message specifying its unavailability, to a configuration report and generating missing configuration objects, based on the deployment associated with the application, and updating each required configuration;
inspecting each selected required configuration to identify any references contained therein to further configurations that are required;
performing the matching again in respect of each said further configuration;
iterating the inspecting and the matching to follow the references until all such references are exhausted by one of successful matching of a required configuration to an available configuration and generating one or more required missing configurations;
updating the application with the one or more missing configurations; and
outputting the configuration report specifying the available configurations that have been selected as being required by the application and, to the extent that not all required configurations have been matched to available configurations, the one or more generated configurations.

11. The computer automated method of claim 10, wherein in cases where all required configurations have been matched to available configurations, the method further comprises:
configuring the server to run the application based on the configuration report; and
deploying the application on the server.

12. The computer automated method of claim 10, wherein, when a required configuration is matched to only one available configuration, then selecting that configuration, and wherein, when a required configuration is matched to multiple available configurations which provide respective suitable candidates for selection, then prompting a user to make a selection from among the suitable candidates via a user interface.

13. The computer automated method of claim 10, wherein the application comprises at least one artefact and the matching, inspecting, performing and iterating are performed separately for each artefact.

14. The computer automated method of claim 13, wherein said at least one artefact includes at least one process flow artefact.

15. A computer program product storing a computer program comprising software code portions, which, when run on a computing device, cause the computing device to perform a method for supporting deployment of an application on a server, the server being provided with a set of configurations that are available for use by applications deployed on the server, the method comprising:
matching configurations required by the application to configurations available in the set of configurations, wherein, for each required configuration that is matched to at least one configuration that is available in the set of configurations, selecting one of the available configurations, and wherein, for each required configuration that cannot be matched, generating an error message specifying its unavailability and generating missing configuration objects, based on the deployment associated with the application, and updating each required configuration;
inspecting each selected required configuration to identify any references contained therein to further configurations that are required;
performing the matching again in respect of each said further configuration;
iterating the inspecting and the matching to follow the references until all such references are exhausted by one of successful matching of a required configuration to an available configuration and generating a user-readable text error message indicating unavailability of a required configuration, to a configuration report; and
outputting the configuration report specifying the available configurations that have been selected as being required by the application and, to the extent that not all required configurations have been matched to available configurations, the error messages.

16. The computer program product of claim 15, wherein in cases where all required configurations have been matched to available configurations, the method further comprises:
configuring the server to run the application based on the configuration report; and
deploying the application on the server.

17. The computer program product of claim 15, wherein, when a required configuration is matched to only one available configuration, then selecting that configuration, and wherein, when a required configuration is matched to multiple available configurations which provide respective suitable candidates for selection, then prompting a user to make a selection from among the suitable candidates via a user interface.

18. A server apparatus provided with a set of configurations that are available for use by applications deployed on the server apparatus and an application configuration tool operable to support deployment of an application on the server apparatus by:
matching configurations required by the application to configurations available in the set of configurations, wherein, for each required configuration that is matched to at least one configuration that is available in the set of configurations, selecting one of the available configurations, and wherein, for each required configuration that cannot be matched, generating an error message specifying its unavailability and generating missing configuration objects, based on the deployment associated with the application, and updating each required configuration;
inspecting each selected required configuration to identify any references contained therein to further configurations that are required;
performing the matching again in respect of each said further configuration;
iterating the inspecting and the matching to follow the references until all such references are exhausted by one of successful matching of a required configuration to an available configuration and generating a user-readable text error message indicating unavailability of a required configuration, to a configuration report; and
outputting the configuration report specifying the available configurations that have been selected as being required by the application and, to the extent that not all required configurations have been matched to available configurations, the error messages.

19. The server apparatus of claim 18, wherein in cases where all required configurations have been matched to available configurations, the application configuration tool is further operable to:
configure the server apparatus to run the application based on the configuration report; and
deploy the application on the server apparatus.

20. The server apparatus of claim 18, wherein, when a required configuration is matched to only one available configuration, then the application configuration tool is further operable to select that configuration, and wherein, when a required configuration is matched to multiple available configurations which provide respective suitable candidates for selection, then prompt a user to make a selection from among the suitable candidates via a user interface.

21. The server apparatus of claim 18, wherein the application comprises at least one artefact and the matching, inspecting, performing and iterating are performed separately for each artefact.

22. The server apparatus of claim 21, wherein said at least one artefact includes at least one process flow artefact.

23. The server apparatus of claim 22, wherein the server apparatus comprises a plurality of processing nodes and each processing node is associated with a requirement for at least one configuration, and wherein each process flow artefact defines a process flow of the application in terms of how the application traverses the processing nodes.

24. The server apparatus of claim 18, wherein the configurations are classified by type and the matching of configurations requires a matching of type.

25. The server apparatus of claim 18, wherein the set of configurations is associated with a set of constraints defining conditions that are to be fulfilled by selected configurations and the application configuration tool is further operable to check that the selected configurations satisfy the constraints.

\* \* \* \* \*